United States Patent [19]

Nagase et al.

[11] 4,276,504
[45] Jun. 30, 1981

[54] CONTROL DEVICE FOR COMMUTATORLESS MOTOR

[75] Inventors: Hiroshi Nagase; Toshiaki Okuyama; Yuzuru Kubota, all of Hitachi, Japan

[73] Assignee: Hitachi, Ltd., Tokyo, Japan

[21] Appl. No.: 971,270

[22] Filed: Dec. 20, 1978

[30] Foreign Application Priority Data

Feb. 3, 1978 [JP] Japan ................... 53-10466

[51] Int. Cl.³ .............................................. H02P 7/28
[52] U.S. Cl. ................................... 318/721; 318/722; 318/723; 318/802
[58] Field of Search ....................... 318/138, 720–723, 318/799–803, 807–812

[56] References Cited

U.S. PATENT DOCUMENTS

| 3,832,624 | 8/1974 | Gilmore et al. | 318/721 X |
| 3,872,364 | 3/1975 | Hübner | 318/721 X |
| 3,894,277 | 7/1975 | Tachibana et al. | 318/721 X |
| 4,044,284 | 8/1977 | Plunkett et al. | 318/803 |
| 4,051,419 | 9/1977 | Takahashi | 318/721 |
| 4,125,796 | 11/1978 | Nagase et al. | 318/721 |

Primary Examiner—Gene Z. Rubinson
Attorney, Agent, or Firm—Craig & Antonelli

[57] ABSTRACT

A control device for a thyristor motor is disclosed by which the advance angle is switched at a predetermined slow rate of change in order to avoid an abrupt change in the motor torque. The thyristor motor comprises a thyristor frequency converter for a frequency conversion and a synchronous motor driven by the frequency converter, and in the thyristor motor the advance angle is switched at low and high speeds of the motor.

7 Claims, 17 Drawing Figures

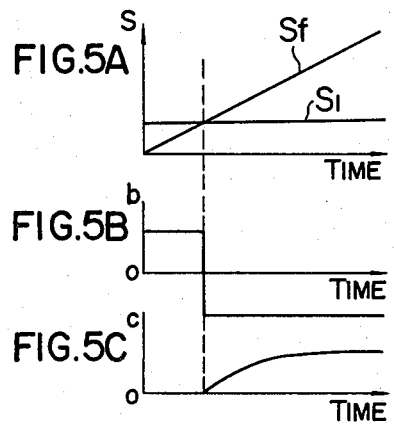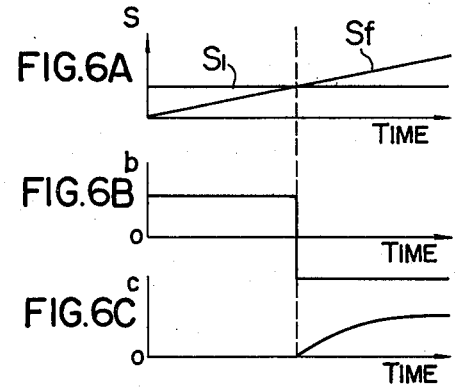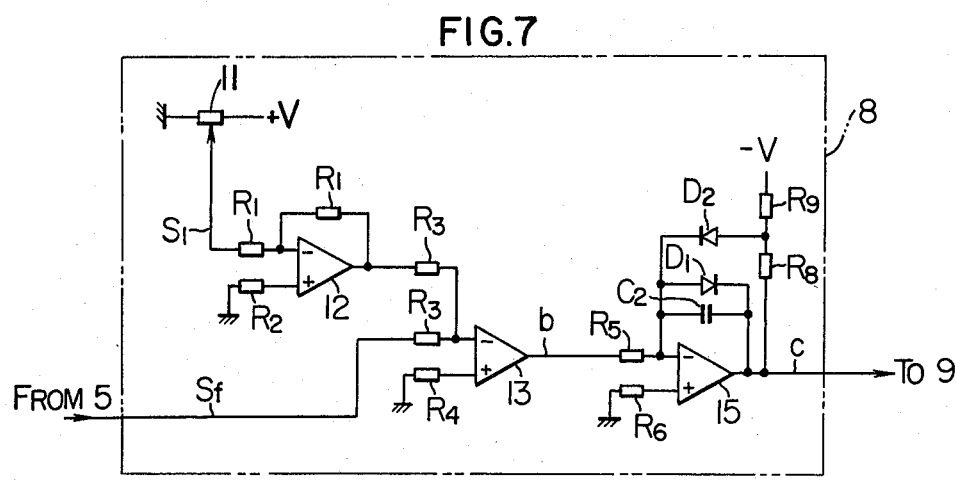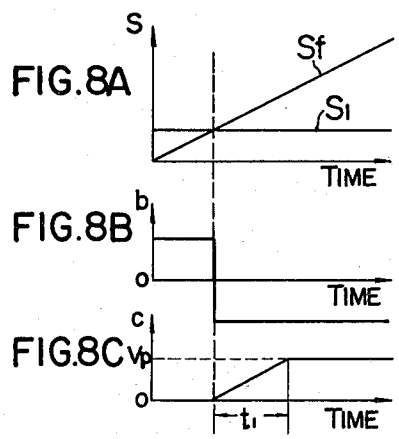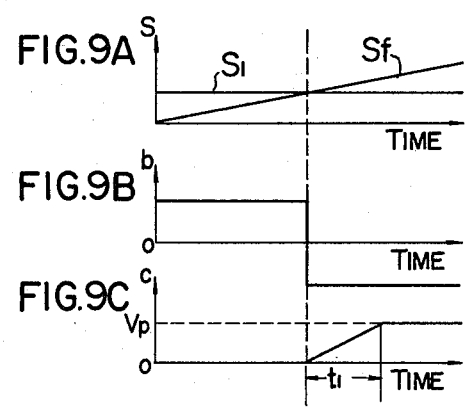

CONTROL DEVICE FOR COMMUTATORLESS MOTOR

BACKGROUND OF THE INVENTION

1. Field of the Invention

This invention relates to an improvement in a control device for a commutatorless motor.

2. Description of the Prior Art

A commutatorless motor is generally comprised of a combination of a synchronous motor and a thyristor power converter. The commutatorless motor is hereinafter referred to as a thyristor motor.

In the thyristor motor in general, the phase of the armature current is advanced before that of the terminal voltage of the thyristor motor driven at high speed, so that commutation of the thyristor power converter, i.e., load commutation of the frequency converter is effected by the induced electromotive force of the synchronous motor. The above-mentioned phase difference between the armature current and the terminal voltage of the thyristor motor is called an advance angle $\beta$.

At low motor speeds where the induced electromotive force of the motor is small, load commutation is difficult and therefore power commutation or other means of commutation is effected. In this case, the advance angle $\beta$ is set at a small value in order to obtain a large motor torque. At high motor speeds, on the other hand, the advance angle $\beta$ must be set at a high value in order to effect the load commutation.

The value of the advance angle $\beta$ is thus required to be switched or changed between high and low speeds. The motor torque $\tau$ is generally expressed as $\tau = K \cdot \cos \beta$ ..... (1). As apparent from the equation (1), if the advance angle $\beta$ is switched stepwise, the torque generated by the motor is changed suddenly, thereby adversely affecting the motor or load or, in some cases, resulting in commutation failure. In order to avoid this, it is common practice to reduce the armature current to zero temporarily so that commutation failure may be avoided and at the same time the torque change may be maintained at a small value. When the armature current is reduced to zero temporarily, the motor torque is also reduced to zero temporarily. Therefore the fact remains that a torque change occurs. Further, if thyristor motor is used for rolling mill or the like which is rapidly accelerated or decelerated, even the time (5 to 10 ms) required for a switching of the advance angle cannot be ignored. With the intention of obviating the problem of sudden change in motor torque, the present applicant has formerly proposed a control method for effectively developing motor torque by changing the advance angle continuously in accordance with motor speed. Such a method is disclosed in U.S. Pat. No. 3,894,277 and will be briefly explained below.

As shown in FIG. 1, when the motor is running at low speed below $S_1$ at the time of starting, the advance angle $\beta$ is controlled at the small value of $\beta_1$ in order to obtain a large motor torque. During the period where the advance angle $\beta$ changes from $\beta_1$ to $\beta_2$ in a high speed range beyond $S_2$, the advance angle $\beta$ is increased along a straight line with the gradient shown in FIG. 1 in accordance with the motor speed. If the advance angle $\beta$ is controlled in this way, motor torque does not change very suddenly.

In some cases, however, the thyristor motor is required to be accelerated or decelerated at much higher rate than in the case mentioned above. In the case of a motor used for driving the rollers of a rolling mill, for instance, a predetermined high speed must be reached about two seconds after starting. Such a motor is required to be decelerated at a similarly rapid rate. If the advance angle $\beta$ is switched or changed within a possible speed range for such a sudden acceleration or deceleration, the inconveniences as mentioned below occur.

A tacho-generator is generally used for a speed detection. The low speed output characteristics of the tacho-generator are not linear and contain many ripples. As a result, in spite of a fixed rate of acceleration or deceleration, the advance angle $\beta$ variously changes within the range hatched in FIG. 2. A change in a predetermined pattern is thus not expected. In an extreme case, the advance angle $\beta$ changes in a pattern shown by dashed line D in FIG. 2. The advance angle $\beta$ rising along the sharp dashed line D changes quite suddenly. The result is a very abrupt change in torque, thus adversely affecting the motor and the load unavoidably.

SUMMARY OF THE INVENTION

It is an object of the present invention to provide a control device for a commutatorless motor, which controls the advance angle in such a manner that the motor torque fails to change suddenly when the advance angle is switched from a low speed to a high speed vice versa.

BRIEF DESCRIPTION OF THE DRAWINGS

FIGS. 5A to 5C and 6A to 6C show waveforms for explaining the operation of the advance angle control command circuit shown in FIG. 4.

FIG. 7 is a circuit diagram showing in detail another embodiment of the advance angle control command circuit in the embodiment of FIG. 3.

FIGS. 8A to 8C and 9A to 9C show waveforms for explaining the operation of the advance angle control command circuit shown in FIG. 7.

DESCRIPTION OF THE PREFERRED EMBODIMENTS

Figure 3:
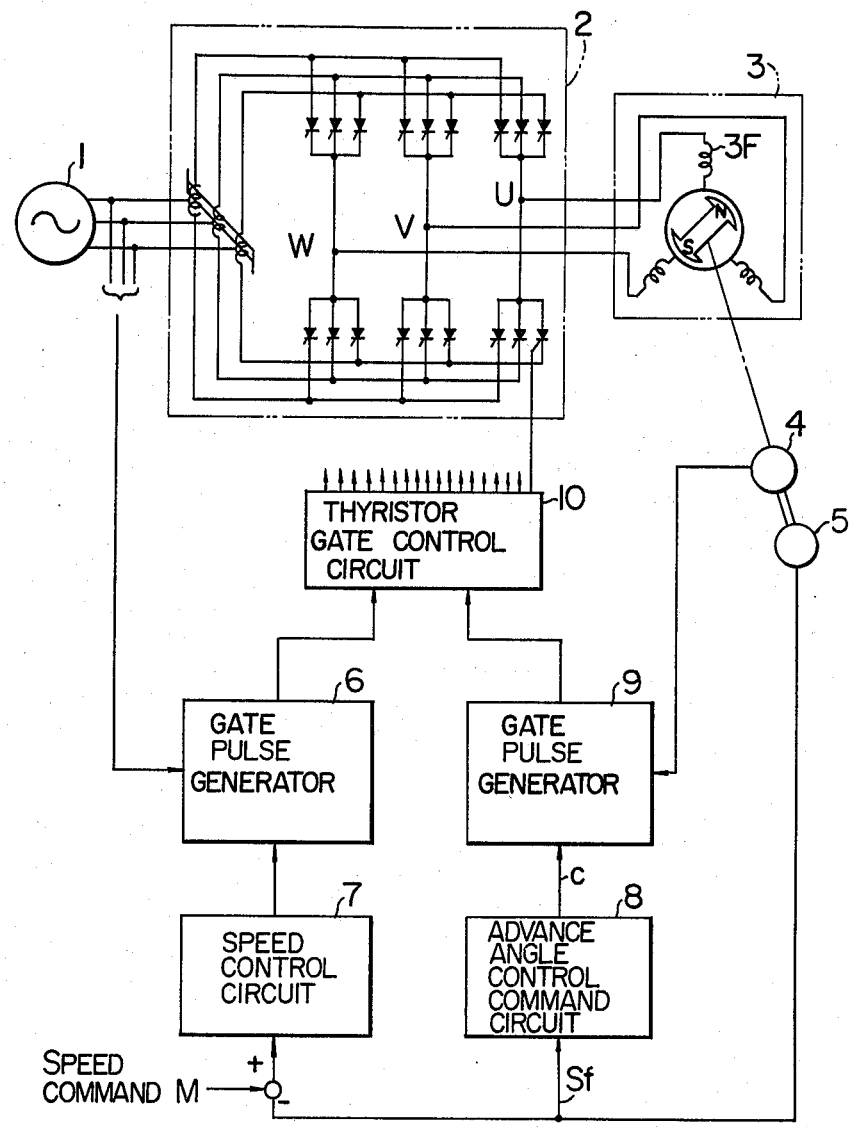
FIG. 3 is a block diagram showing a circuit according to an embodiment of the present invention using a cyclo-converter as a power converter.

In FIG. 3, reference numeral 1 shows an AC power supply, numeral 2 a cyclo-converter having a plurality of thyristors for converting the frequency of the AC power supply 1 into a motor frequency, numeral 3 a synchronous motor driven by the cyclo-converter 2, numeral 3F a field winding of the motor 3, numeral 4 a position detector for detecting the position of an armature relative to the field of the synchronous motor 3, numeral 5 a tacho-generator for detecting a revolution speed of the synchronous motor 3, numeral 6 a well-known voltage-regulating gate pulse generator for controlling the revolution speed of the synchronous motor 3 by controlling the firing angle of the thyristors to the power supply voltage, hereinafter referred to as a firing angle on a power supply side, numeral 7 shows a speed control circuit producing an analog signal for controlling the gate pulse generator 6 in response to a speed command M, numeral 8 a circuit which is impressed with an output signal Sf of the speed detector, i.e., the tacho-generator 5 and produces a command signal C for controlling the advance angle $\beta$, i.e., the firing angle for the thyristors on the motor side, and numeral 9 a well-known gate pulse generator which is impressed with the analog output siganl C from the advance angle control command circuit 8 and controls the firing angle of the thyristors on the motor side in accordance with the magnitude of the output signal C. The firing angle of the thyristors on the motor side of the cyclo-converter 2 is determined by utilizing the output signal of the position detector 4. Numeral 10 shows a circuit for generating a logical product of output signals from the gate pulse generators 6 and 9 in order to apply a gate controlling signal to each thyristor of the cyclo-converter 2.

The advance angle control command circuit 8, except for which the control operation of the thyristor motor constructed as mentioned above is well known, will be briefly explained below. The gate pulse generator 9 decides a firing angle on the motor side sequentially in response to the position signal from the position detector 4, in such a manner that the armature current has a predetermined phase relation with the terminal voltage. On the other hand, the gate pulse generator 6 decides the firing angle on the power supply side in a phase corresponding to the output of the speed control circuit 7 responsive to the speed command M. The thyristor gate control circuit 10 sequentially fires the thyristors by the logical product of the outputs from the gate pulse generator 6 and 9, thereby controlling the magnitude of armature current (speed) of the synchronous motor 3. In this way, the speed of the synchronous motor 3 responds on the speed command M.

Figure 1:
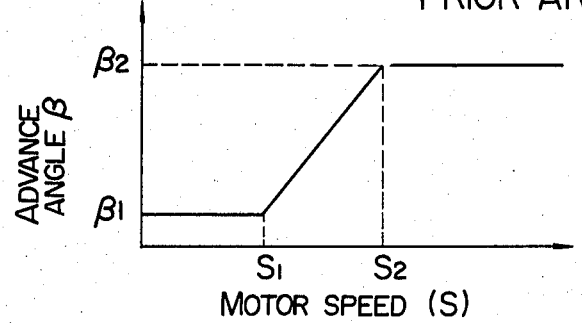
FIGS. 1 and 2 are graphs showing the advance angle control method disclosed in U.S. Pat. No. 3,894,277 cited as the prior art.
Figure 2:
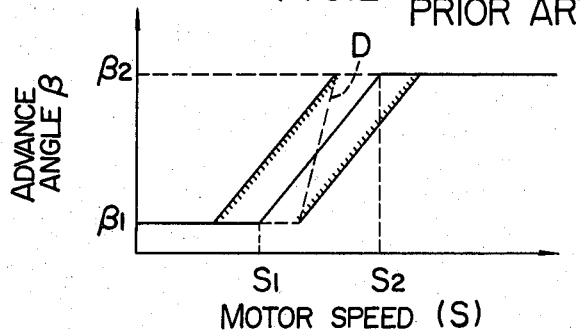
Figure 4:
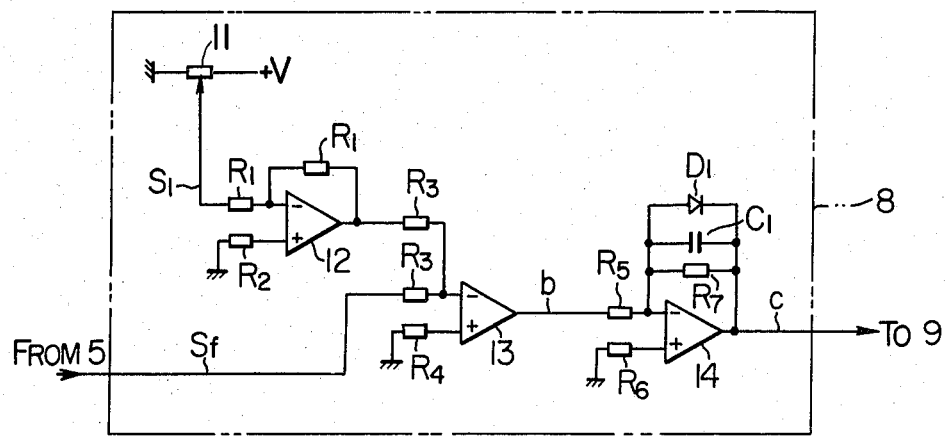
FIG. 4 is a circuit diagram showing in detail the advance angle control command circuit in the embodiment of FIG. 3.

The advance angle control command circuit 8 in the embodiment of FIG. 3 is shown in detail in the circuit diagram of FIG. 4. The operation of this circuit will be explained below with reference to FIGS. 5A to 5C and 6A to 6C.

In FIG. 4, numeral 11 shows a circuit for setting the motor speed $S_1$ at which the advance angle $\beta$ is switched, and the circuit may include, for example, a conventional potentiometer. Numerals 12, 13 and 14 show operational amplifiers, characteristic $R_1$ to $R_7$ resistors, character $C_1$ a capacitor, and $D_1$ a diode. The operational amplifier 12 is effected to make inverse the signal $S_1$, and the operational amplifier 13 compares the set value $S_1$ of the speed setting circuit 11 with the output signal $S_f$ of the tacho-generator 5, and produces the output signal b having a negative level when the signal $S_f$ exceeds the set value $S_1$ as shown in FIGS. 5A and 5B. When the output signal b of the operational amplifier 13 is at a positive level, the motor is operable in a low speed range by a power supply commutation, while if the output signal b is at a negative level, a high speed range is involved where the commutation is effected by the induced electromotive force of the motor.

The operational amplifier 14 makes up a first-order lag circuit. When the output b of the operational amplifier 13 undergoes a change from the positive level to the negative level, the output signal b is changed by the time constant determined by the resistor $R_7$ and capacitor $C_1$. Thus the output signal c of the operational amplifier 14 as shown by the gentle curve in FIG. 5C is produced with the first-order lag.

The diagram of FIG. 5A shows, as noted from the gradient of the straight line $S_f$, a case where the speed signal $S_f$ changes at a great rate, that is, where the acceleration of the motor changes at a high rate. FIG. 6A, on the other hand, represents a case where the rate of change in the speed signal $S_f$ is low. In the latter case, too, the operational amplifier 13 produces the output signal b as in the case of FIG. 5B, with the result that the output signal c with the same curve as that in FIG. 5C is produced from the operational amplifier 14 as shown in FIG. 6C. In this way, the signal c produced from the advance angle control command circuit 8 changes always and slowly with a predetermined time constant regardless of the magnitude of the rate of change in motor acceleration or deceleration. The advance angle $\beta$ is proportional to the signal c, and therefore the gradual change of signal c causes the advance angle $\beta$ to be controlled at a slow rate.

The output signal of the advance angle control command circuit 8 is applied to the gate pulse generator 9. The gate pulse generator 9 is impressed with the output voltage of the advance angle control command circuit 8 as a control voltage. Since the output signal c is proportional to the advance angle $\beta$, the gate pulse generator 9 operates to change the advance angle $\beta$ in the manner shown in FIG. 5C or 6C. Thus the cyclo-converter 2 is controlled in such a manner that the firing angle of the thyristors on the motor side (advance angle) is switched with a predetermined time constant or predetermined time length.

Another embodiment of an advance angle control command circuit different from that shown in FIG. 4 is illustrated in FIG. 7, in which like reference numerals and characters denote like or equivalent component elements in FIG. 4. The operational amplifier 14, which has the function as a first-order lag circuit in the embodiment of FIG. 4, is replaced by an integrator 15 with limiter as shown in FIG. 7. The integrator 15 with limiter integrates the input signal b thereto until the integration result reaches the voltage $V_p$ which is obtained by dividing the circuit source voltage $-V$ by the resistors $R_8$ and $R_9$. As a result, the waveform of the output signal c of the integrator 15 is as shown in FIG. 8C or 9C and takes the form of a straight line having a constant inclination for the period $t_1$ until the voltage $V_p$ is reached. It is already explained with reference to FIGS. 5A and 6A that FIGS. 8A and 9A represent the cases where the speed signal $S_f$ undergoes a great change and a small change respectively.

It will be understood from the foregoing description that according to the control device of the present invention, the advance angle $\beta$ changes slowly, and therefore the motor torque is changed not suddenly but slowly at predetermined rate. The result is that the torque generated by the motor in switching the advance angle is not changed suddenly, thus preventing the motor and the load from being adversely affected.

Further, according to the present invention, the advance angle is changed at a predetermined constant rate, thus making it possible to change the advance angle without being affected by the error of the tacho-generator or operating condition or without any sudden change in torque.

Although the above-mentioned embodiment of FIG. 3 concerns the case in which a cyclo-converter is used as the power converter, the power converter may alternatively take the form of what is called DC link type in which an AC power is rectified by a rectifier into a DC power and then inverted by an inverter.

We claim:

1. An advance angle control apparatus for a commutatorless motor, comprising
frequency converter means including a plurality of thyristors for converting a frequency in order to supply an AC power to armature windings of a synchronous motor,
a position detector for detecting the position of the rotor of said synchronous motor,
a speed detector for detecting an actual speed of said synchronous motor,
a speed control means including a first gate pulse generator for controlling the firing phase of said thyristors in accordance with a signal obtained by comparing the actual speed with a command speed,
a second gate pulse generator for generating signals controlling the gates of said thyristors in accordance with the output of said position detector, and
an advance angle control command circuit applied with the output of said speed detector,
for outputting to said second gate pulse generator a signal with a low value for an advance angle at a low speed of said synchronous motor and a high value for the advance angle at a high speed, said advance angle control command circuit comprising a comparator for comparing the actual speed value with a reference value provided by a speed setting circuit, and a change regulating circuit applied with the output of said comparator for regulating a change between advance angle control command signals at the low speed and the high speed during a predetermined time interval, and the output of which is applied to said second gate pulse generator as the advance angle control command signals, said comparator switching its output signal from a constant value to another constant value when the actual speed value reaches a predetermined speed value.

2. An advance angle control apparatus according to claim 1 wherein said change regulating circuit is a first-order delay member.

3. An advance angle control apparatus according to claim 1, wherein said change regulating circuit is an integration circuit with an output signal limitation.

4. In a control device for a commutatorless motor, having a thyristor power converter to supply power to said motor, control means to supply control signals to the gate of the thyristor of the power converter, generator means to supply to the control means a signal whose advance angle is variable when the motor runs at a speed higher than a predetermined speed, wherein the improvement comprises:
an advance angle control means for regulating the change in said advance angle independent of the rate of change of said motor speed.

5. The improved control device of claim 4 wherein said advance angle control means comprises a comparator for comparing the actual speed value with a reference value provided by a speed setting circuit and a change regulating means supplied with the output of said comparator for regulating a change between the advance angle control command signals at a low speed and the high speed during a predetermined time interval.

6. The improved control device of claim 5, wherein said change regulating means is a first-order delay member.

7. The improved control device of claim 5, wherein said change regulating circuit is an integration circuit with an output signal limitation.

* * * * *